(12) United States Patent
Yang et al.

(10) Patent No.: US 12,205,299 B2
(45) Date of Patent: Jan. 21, 2025

(54) VIDEO MATTING

(71) Applicant: Lemon Inc., Grand Cayman (KY)

(72) Inventors: Linjie Yang, Los Angeles, CA (US);
Peter Lin, Los Angeles, CA (US);
Imran Saleemi, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 690 days.

(21) Appl. No.: 17/396,055

(22) Filed: Aug. 6, 2021

(65) Prior Publication Data

US 2023/0044969 A1 Feb. 9, 2023

(51) Int. Cl.
*G06T 7/194* (2017.01)
*G06T 3/40* (2024.01)
*G06T 7/11* (2017.01)
*G06V 20/40* (2022.01)

(52) U.S. Cl.
CPC ............ *G06T 7/194* (2017.01); *G06T 3/40* (2013.01); *G06T 7/11* (2017.01); *G06V 20/46* (2022.01); *G06T 2207/10016* (2013.01); *G06T 2207/20081* (2013.01); *G06T 2207/30196* (2013.01)

(58) Field of Classification Search
CPC ... G06T 7/194; G06T 3/40; G06T 7/11; G06T 2207/10016; G06T 2207/20081; G06T 2207/30196; G06T 2207/20084; G06V 20/46; G06V 10/82; G06V 20/695; G06V 10/454
See application file for complete search history.

(56) References Cited

U.S. PATENT DOCUMENTS

| | | | | |
|---|---|---|---|---|
| 9,430,715 | B1* | 8/2016 | Wang | G06T 5/94 |
| 2012/0020554 | A1* | 1/2012 | Sun | G06T 7/11 |
| | | | | 382/164 |
| 2012/0075331 | A1* | 3/2012 | Mallick | G06V 40/162 |
| | | | | 345/594 |
| 2014/0002746 | A1* | 1/2014 | Bai | G06T 7/11 |
| | | | | 348/E5.077 |
| 2014/0003719 | A1* | 1/2014 | Bai | G06T 7/269 |
| | | | | 382/173 |
| 2017/0116481 | A1* | 4/2017 | Chen | G06F 18/21345 |
| 2019/0037150 | A1* | 1/2019 | Srikanth | H04N 23/62 |
| 2019/0206066 | A1* | 7/2019 | Saleemi | G06V 20/54 |
| 2020/0340798 | A1* | 10/2020 | Izatt | G06T 15/08 |
| 2021/0383242 | A1* | 12/2021 | Ostyakov | G06T 7/11 |
| 2023/0360177 | A1* | 11/2023 | Lee | G06N 3/045 |
| 2024/0153255 | A1* | 5/2024 | Kaneko | G06V 20/46 |

* cited by examiner

*Primary Examiner* — Mia M Thomas
(74) *Attorney, Agent, or Firm* — BakerHostetler

(57) ABSTRACT

The present disclosure describes techniques of improving video matting. The techniques comprise extracting features from each frame of a video by an encoder of a model, wherein the video comprises a plurality of frames; incorporating, by a decoder of the model, into any particular frame temporal information extracted from one or more frames previous to the particular frame, wherein the particular frame and the one or more previous frames are among the plurality of frames of the video, and the decoder is a recurrent decoder; and generating a representation of a foreground object included in the particular frame by the model, wherein the model is trained using segmentation dataset and matting dataset.

17 Claims, 19 Drawing Sheets

| Backbone | $E_{\frac{1}{2}}$ | $E_{\frac{1}{4}}$ | $E_{\frac{1}{8}}$ | $E_{\frac{1}{16}}$ | $AS$ | $D_{\frac{1}{16}}$ | $D_{\frac{1}{8}}$ | $D_{\frac{1}{4}}$ | $D_{\frac{1}{2}}$ | $D_{\frac{1}{1}}$ |
|---|---|---|---|---|---|---|---|---|---|---|
| Ours | 16 | 24 | 40 | 960 | 128 | 128 | 80 | 40 | 32 | 16 |
| Ours Large | 64 | 256 | 512 | 2048 | 256 | 256 | 128 | 64 | 32 | 16 |

500

```
┌─────────────────────────────────────────────────────────────┐
│ Extract features from each frame of a video by an encoder   │
│ of a model, wherein the video comprises a plurality of      │
│ frames 502                                                  │
└─────────────────────────────────────────────────────────────┘
                              │
                              ▼
┌─────────────────────────────────────────────────────────────┐
│ Incorporate, by a decoder of the model, into any particular │
│ frame temporal information extracted from one or more       │
│ frames previous to the particular frame, wherein the        │
│ particular frame and the one or more previous frames are    │
│ among the plurality of frames of the video, and the decoder │
│ is a recurrent decoder 504                                  │
└─────────────────────────────────────────────────────────────┘
                              │
                              ▼
┌─────────────────────────────────────────────────────────────┐
│ Generate a representation of a foreground object included   │
│ in the particular frame by the model, wherein the model is  │
│ trained using segmentation dataset and matting dataset 506  │
└─────────────────────────────────────────────────────────────┘
```

Algorithm 1: Training Procedures for $stage \in [1, 2, 3, 4]$ do
    for *epoch* do
        for *iteration* do
            LowResMattingPass($B, T, h, w$)
            if $stage \in [3, 4]$ then
                HighResMattingPass($B, \tilde{T}, \hat{h}, \hat{w}$)
            if *iteration* % 2 = 0 then
                VideoSegmentationPass($B, T, h, w$)
            else
                ImageSegmentationPass($B', 1, h, w$)

| Dataset | Method | Alpha | | | | | FG |
|---|---|---|---|---|---|---|---|
| | | MAD | MSE | Grad | Conn | dtSSD | MSE |
| VM 512×288 | DeepLabV3 | 14.47 | 9.67 | 8.55 | 1.69 | 5.18 | |
| | FBA | 8.36 | 3.37 | 2.09 | 0.75 | 2.09 | |
| | BGMv2 | 25.19 | 19.63 | 2.28 | 3.26 | 2.74 | |
| | MODNet | 9.41 | 4.30 | 1.89 | 0.81 | 2.23 | |
| | Ours | 6.08 | 1.47 | 0.88 | 0.41 | 1.36 | |
| D646 512×512 | DeepLabV3 | 24.50 | 20.1 | 20.30 | 6.41 | 4.51 | |
| | FBA | 17.98 | 13.40 | 7.74 | 4.65 | 2.36 | 5.84 |
| | BGMv2 | 43.62 | 38.84 | 5.41 | 11.32 | 3.08 | 2.60 |
| | MODNet | 10.62 | 5.71 | 3.35 | 2.45 | 1.57 | 6.31 |
| | Ours | 7.28 | 3.01 | 2.81 | 1.83 | 1.01 | 2.93 |
| AIM 512×512 | DeepLabV3 | 29.64 | 23.78 | 20.17 | 7.71 | 4.32 | |
| | FBA | 23.45 | 17.66 | 9.05 | 6.05 | 2.29 | 6.32 |
| | BGMv2 | 44.61 | 39.08 | 5.54 | 11.60 | 2.69 | 3.31 |
| | MODNet | 21.66 | 14.27 | 5.37 | 5.23 | 1.76 | 9.51 |
| | Ours | 14.84 | 8.93 | 4.35 | 3.83 | 1.01 | 5.01 |

| Dataset | Method | SAD | MSE | Grad | dtSSD |
|---|---|---|---|---|---|
| VM 1920×1080 | MODNet + FGF | 11.13 | 5.54 | 15.30 | 3.08 |
| | Ours | 6.57 | 1.93 | 10.55 | 1.90 |
| D646 2048×2048 | MODNet + FGF | 11.27 | 6.13 | 30.78 | 2.19 |
| | Ours | 8.67 | 4.28 | 30.06 | 1.64 |
| AIM 2048×2048 | MODNet + FGF | 17.29 | 10.10 | 35.52 | 2.60 |
| | Ours | 14.89 | 9.01 | 34.97 | 1.71 |

FIG. 10

| Method | Parameters (Million) | Size (MB) |
|---|---|---|
| DeepLabV3 | 60.996 | 233.3 |
| FBA | 34.693 | 138.8 |
| BGMv2 | 5.007 | 19.4 |
| MODNet | 6.487 | 25.0 |
| Ours | 3.749 | 14.5 |

| Resolution | s | Method | FPS | GMACs* |
|---|---|---|---|---|
| 512×288 | 1 | DeepLabV3 + FBA | 12.3 | 205.77 |
| | | BGMv2 | 152.5 | 8.46 |
| | | MODNet | 104.9 | 8.80 |
| | | Ours | 131.9 | 4.57 |
| 1920×1080 | 0.25 | BGMv2 | 70.6 | 9.86 |
| | | MODNet + FGF | 100.3 | 7.78 |
| | | Ours | 104.2 | 4.15 |
| 3840×2160 | 0.125 | BGMv2 | 26.5 | 17.04 |
| | | MODNet + FGF | 88.6 | 7.78 |
| | | Ours | 76.5 | 4.15 |

1700

| Method | mIOU |
|---|---|
| DeepLabV3 | 68.93 |
| MobileNetV3 + LR-ASPP | 58.58 |
| Ours (alpha output, no seg objective) | 38.24 |
| Ours (alpha output) | 60.88 |
| Ours (segmentation output) | 61.50 |

| Method | Params | FPS | MAD | MSE | Grad | dtSSD |
|---|---|---|---|---|---|---|
| Ours (FGF) | 3.748 | 109.4 | 8.70 | 4.13 | 31.44 | 1.89 |
| Ours | 3.749 | 104.2 | 8.67 | 4.28 | 30.06 | 1.64 |

FIG. 18

| Background | Method | MAD | MSE | Grad | dtSSD |
|---|---|---|---|---|---|
| Static | BGMv2* | 4.33 | 0.32 | 4.19 | 1.33 |
| | MODNet + FGF | 11.04 | 5.42 | 15.80 | 3.10 |
| | Ours | 5.64 | 1.07 | 9.80 | 1.84 |
| Dynamic | BGMv2 | 42.45 | 37.05 | 17.30 | 4.61 |
| | MODNet + FGF | 11.23 | 5.65 | 14.79 | 3.06 |
| | Ours | 7.50 | 2.80 | 11.30 | 1.96 |

| Method | Params | Size | FPS | MAD | MSE | Grad | dtSSD |
|---|---|---|---|---|---|---|---|
| Ours Large | 26.890 | 102.9 | 71.1 | 5.81 | 0.97 | 9.65 | 1.78 |
| Ours | 3.749 | 14.5 | 104.2 | 6.57 | 1.93 | 10.55 | 1.90 |

VIDEO MATTING

BACKGROUND

Video matting is a computer vision technique that enables to extract foreground objects from a video. Video matting is a very important technique and has many applications, such as video editing. However, conventional video matting techniques may not fulfil needs of people due to various limitations. Therefore, improvements in video matting techniques are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows an example method performed by a video matting model that may be used in accordance with the present disclosure.

FIG. 8 shows an example training method that may be used in the present disclosure.

FIG. 9 shows an example table illustrating a comparison of the performance of various models, including models in accordance with the present disclosure.

FIG. 10 shows an example table illustrating a comparison of the performance of various models, including models in accordance with the present disclosure.

FIG. 17 shows an example table illustrating a comparison of the segmentation performance of various models, including models in accordance with the present disclosure.

FIG. 18 shows an example table illustrating a comparison of the method using DGF with the method using FGF.

DETAILED DESCRIPTION OF ILLUSTRATIVE EMBODIMENTS

Figure 1:
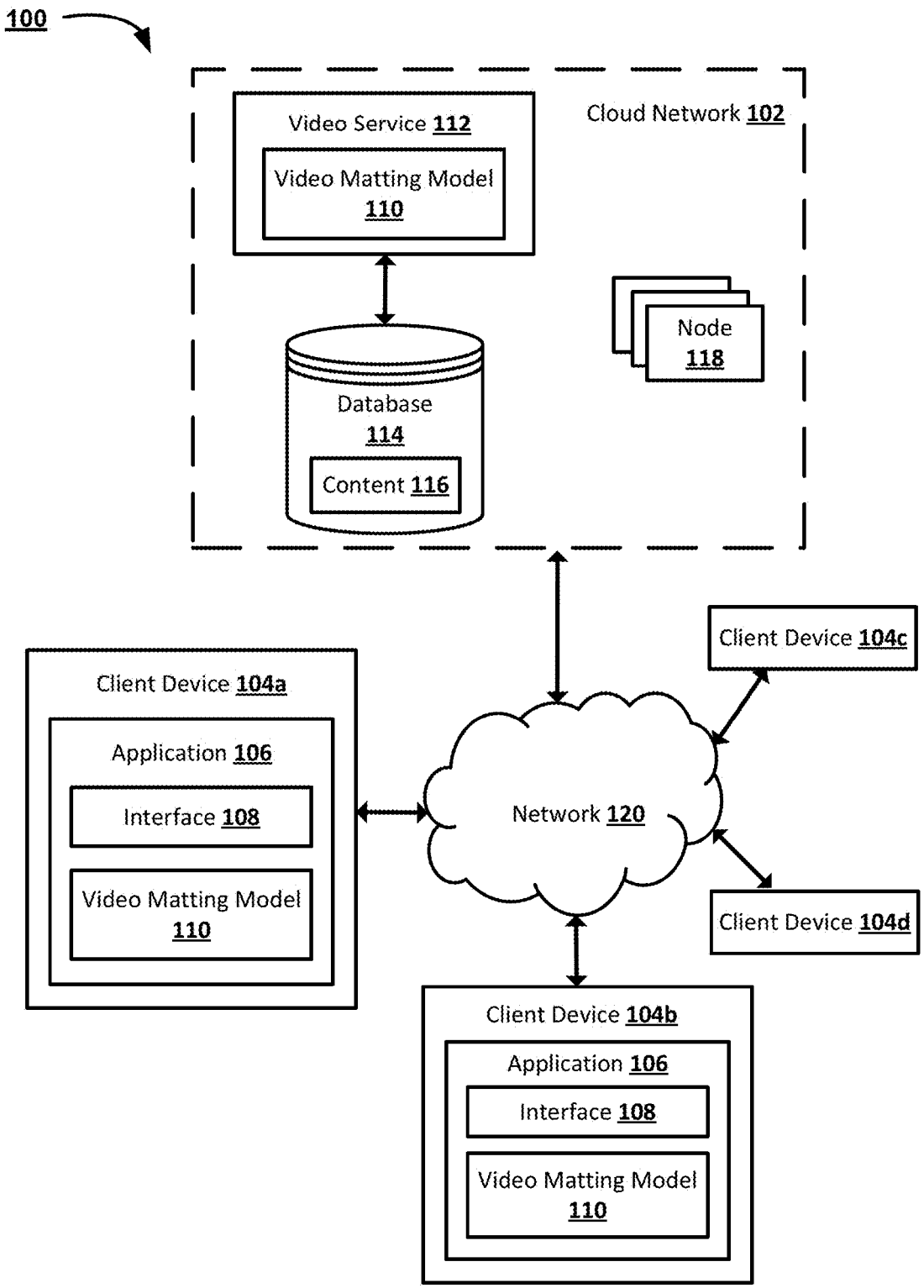
FIG. 1 shows an example system for distributing video content.

Video matting aims to extract foreground objects from video frames, and it is a fundamental technique in the field of computer vision. Video matting techniques have been widely used in video conferencing tools, entertainment video creation, etc. For instance, users may not want to share the details of their background and environment to other people on a video conference for privacy reasons, so they need real-time background replacement on human subjects without green-screen props. Therefore, a robust and high-quality video matting is required.

Video matting may produce an alpha matte used for separating foreground from background in any given video frame. Video matting may comprise a process of predicting an alpha matte and foreground color from an input frame of a video. A frame I can be viewed as the linear combination of a foreground F and a background B through α coefficient:

$$I = \alpha F + (1-\alpha)B, \quad \text{Equation 1}$$

In one example, by extracting α and F, a foreground object can be composited to a new background, thereby achieving and background replacement effect.

Existing video matting techniques process individual frames as independent images, which lead to unsatisfactory temporal consistency. The existing techniques neglect temporal information which is the most widely available feature in videos. Temporal information can improve video matting performance for many reasons. Temporal information allows the prediction of more coherent results since the model with temporal guidance may utilize temporal information extracted from multiple frames. This significantly reduces flicker and improves perceptual quality. Furthermore, temporal information can improve matting robustness. In the cases where an individual frame might be ambiguous, e.g. the foreground color becomes similar to a passing object in the background, the model utilizing temporal information may better predict the boundary by referring to frames previous to any particular frame. In addition, temporal information allows a video matting model to learn more about the background over time. For example, when a camera moves, the background behind the subjects is revealed due to the perspective change. Even if the camera is fixed, the occluded background still often is revealed due to the subjects' movements. Having a better understanding of the background may simplify the video matting task.

Meanwhile, existing video matting models are trained using synthetic matting datasets. The samples often look fake and prevent the video matting network to generalize to real images. Some existing techniques have attempted to initialize a model with weights trained on segmentation tasks, but the model still overfits to the synthetic distribution during the matting training. Other existing techniques have attempted adversarial training or semi-supervised learning using unlabeled real images as an additional adaptation step. However, the performance of existing video matting models is not satisfactory. The present disclosure provides an improved video matting (IVM) model that significantly outperforms the existing video matting techniques while being much lighter and faster. The IVM model may comprise a recurrent architecture to utilize the temporal information for video matting, thereby reducing temporal inconsistency caused by frame-by-frame inference. The IVM model may be an end-to-end neural network comprising recurrent modules for extracting temporal information.

In some embodiments, the IVM model may process high-resolution images. An input high-resolution image may be first downsampled to generate a low-resolution variant. The low-resolution variant may then be encoded using a plurality of encoder blocks. Each encoder block comprises convolution and pooling layers. At the end of the last encoder block, an Astrous Spatial Parameter Pooling (ASPP) module may be used to gather features in different resolutions. After the feature encoding, the decoding module uses a variety of Convolutional Gated Recurrent Unit (ConvGRU) modules to incorporate temporal information extracted from previous frames. After each ConvGRU module, the feature map is upscaled using bilinear sampling and concatenated with features in the encoder blocks. In this way, the features are refined in a coarse-to-fine fashion and the temporal information from different resolutions is extracted and incorporated. In one example, the IVM model may use a Deep Guided Filter (DGF) module to refine details of the output mask. It has been proved that the IVM model significantly improves the matting quality and temporal coherence. The present disclosure provides an improved training technique to address the issue that matting training data are relatively limited. The improved training technique may enforce a network on both matting and segmentation objectives. The improved training technique may incorporate vast segmentation data into a training process. In some embodiments, the segmentation training with segmentation dataset and the matting training with matting dataset are interleaved in the training process.

The present disclosure also uses several loss terms to train a model to further improve the video matting performance. L1 loss and Laplacian loss may be used on the matting mask. A temporal coherence loss may be applied to enforce temporal consistency as well. In additional, a foreground prediction loss to predict color information of the foreground object may also be used. These loss terms should be jointly used to improve the accuracy of the video matting model. If any loss term is excluded from the framework, the completeness of the model training may not be affected, but there may be impact on the performance of the model.

The IVM techniques provided by the present disclosure is significantly lighter than the existing matting techniques. It can process real-time high-resolution videos at 4K 76 FPS and HD 104 FPS on an Nvidia GTX 1080Ti GPU. The IVM techniques outperforms the existing methods and achieves significant improvements in temporal coherence, matting quality, and robustness.

FIG. 1 illustrates an example system 100 for distributing video content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a video service 112. The video service 112 may comprise a content streaming service, such as an Internet protocol video streaming service. The video service 112 may be configured to distribute content 116 via a variety of transmission techniques. The video service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example the video service 112 may comprise a video sharing service, a video hosting platform, a content distribution platform, a collaborative gaming platform, and/or the like.

In an embodiment, the content 116 may be output to different client devices 104 via the network 120. The content 116 may be streamed to the client devices 104. The content stream may be a stream of videos received from the video service 112. The plurality of client devices 104 may be configured to access the content 116 from the video service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The video service 112 may be configured to receive input from users. The users may be registered as users of the video service 112 and may be users of the content application 106 operating on client devices 104. The user input data may include information, such as videos and/or user comments, that the users connected to the video service 112 want to share with other connected users of the video service 112. The video service 112 may be able to receive different types of input from users using different types of client devices 104. For example, a user using the content application 106 on a first user device, such as a mobile phone or tablet, may be able to create and upload videos using the content application 106.

In an embodiment, a user may use the content application 106 on a client device 104 to create a video and upload the video to the cloud network 102. The client devices 104 may access an interface 108 of the content application 106. The interface 108 may comprise an input element. For example, the input element may be configured to allow users to create the video. To create the video, the user may give the content application 106 permission to access an image capture device, such as a camera, or a microphone of the client device 104.

The video service 112 may be configured to output the uploaded videos and user input to other users. The users may be registered as users of the video service 112 to view videos created by other users. The users may be users of the content application 106 operating on client devices 104. The content application 106 may output (e.g., display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

The plurality of computing nodes 118 may process tasks associated with the video service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, at least one of the video services 112 or the client devices 104 comprise a video matting model (e.g., IVM model) 110. The IVM model 110 may be utilized, at least in part, to perform video editing, video object segmentation, visual object tracking, and so on. The IVM model 110 be may be utilized, for example, to perform video editing, video object segmentation, visual object tracking, and so on during the creation of a video before it is uploaded to the video service 112. Additionally, or alternatively, the IVM model 110 may be utilized, to perform video editing, video object segmentation, visual object tracking, and so on after creation and/or uploading of the video to the video service 112.

In an embodiment, the IVM model 110 utilizes a framework that includes a recurrent architecture to aggregate temporal information in videos. The recurrent architecture may comprise a plurality of Convolutional Gated Recurrent Unit (ConvGRU) for incorporating the temporal information. The recurrent architecture improves the matting quality and temporal coherence.

In another embodiment, the IVM model 110 may be trained using segmentation dataset and matting dataset simultaneously. The training method using segmentation dataset and matting dataset can effectively regulate the IVM model 110 without additional adaption steps.

Figure 2:
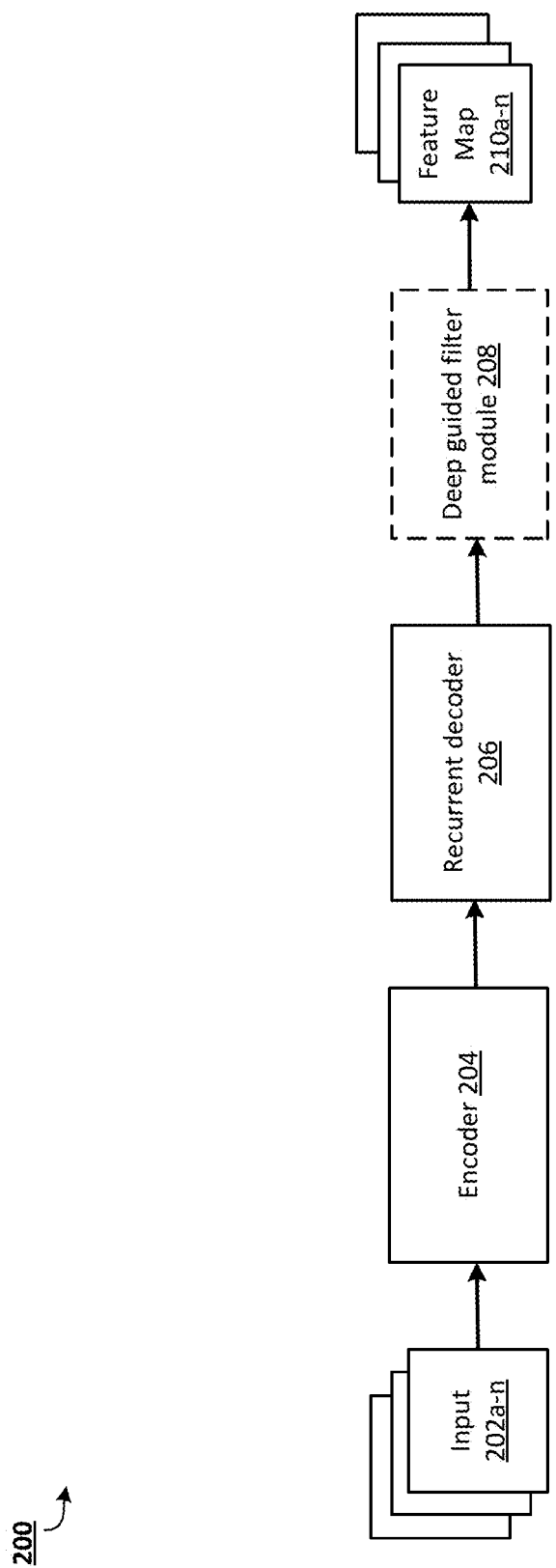
FIG. 2 shows an example system that may be used in accordance with the present disclosure.

FIG. 2 illustrates an exemplary framework 200 that may be utilized by a video matting model (e.g. the IVM model 110). The framework 200 may comprise an encoder 204 and a recurrent decoder 206. Optionally, the framework 200 may comprise a Deep Guided Filter (DGF) module 208 for high-resolution prediction.

The IVM model may receive input 202a-n. The input 202a-n may include one or more frames of a video. For example, an input video may have n frames, and input 202a may include a particular frame of the input video, input 202b may include a second frame of the same video, input 202n may include the last frame of the same video, etc. The number of frames received as input may include all or some of the frames included in a particular video.

The encoder 204 may be a feature encoder. It may extract the features of individual frames. The encoder 204 may receive one or more input video frames 202a-n. For example, the encoder 204 may receive some or all of the video frames included in a particular video. The encoder 204 may, for each input video frame 202a-n, extract a feature representation of the input frames. The extracted feature representations of each input frame may be fed into the recurrent decoder 206.

The recurrent decoder 206 may receive one or more of the extracted feature representations of each input frame from the at least one encoder 204. The recurrent decoder 206 may, for each input video frame 202a-n, aggregate temporal information and merge the extracted feature representations of the input frame.

The DGF module 208 may refine details of the output mask. The DGF module 208 may be used to predict high resolution. The DGF module 208 is optional. If the input frame of a video is low-resolution, the framework 200 comprising encoder 204 and recurrent decoder 206 may work independently without DGF module 208.

The IVM model may output one or more feature maps 210a-n. Each feature map 210a-n may correspond to a particular item of input 202a-n. For example, a feature map 210a may correspond to an input 202a that includes a particular frame of a video, a feature map 210b may correspond to an input 202b that includes a second frame of the same video, etc. Each feature map 210a-n may be a topographical representation of the unique features in the corresponding video frame. For example, the feature map 210a may be a topographical representation of the unique features in the input 202a.

Figure 3:
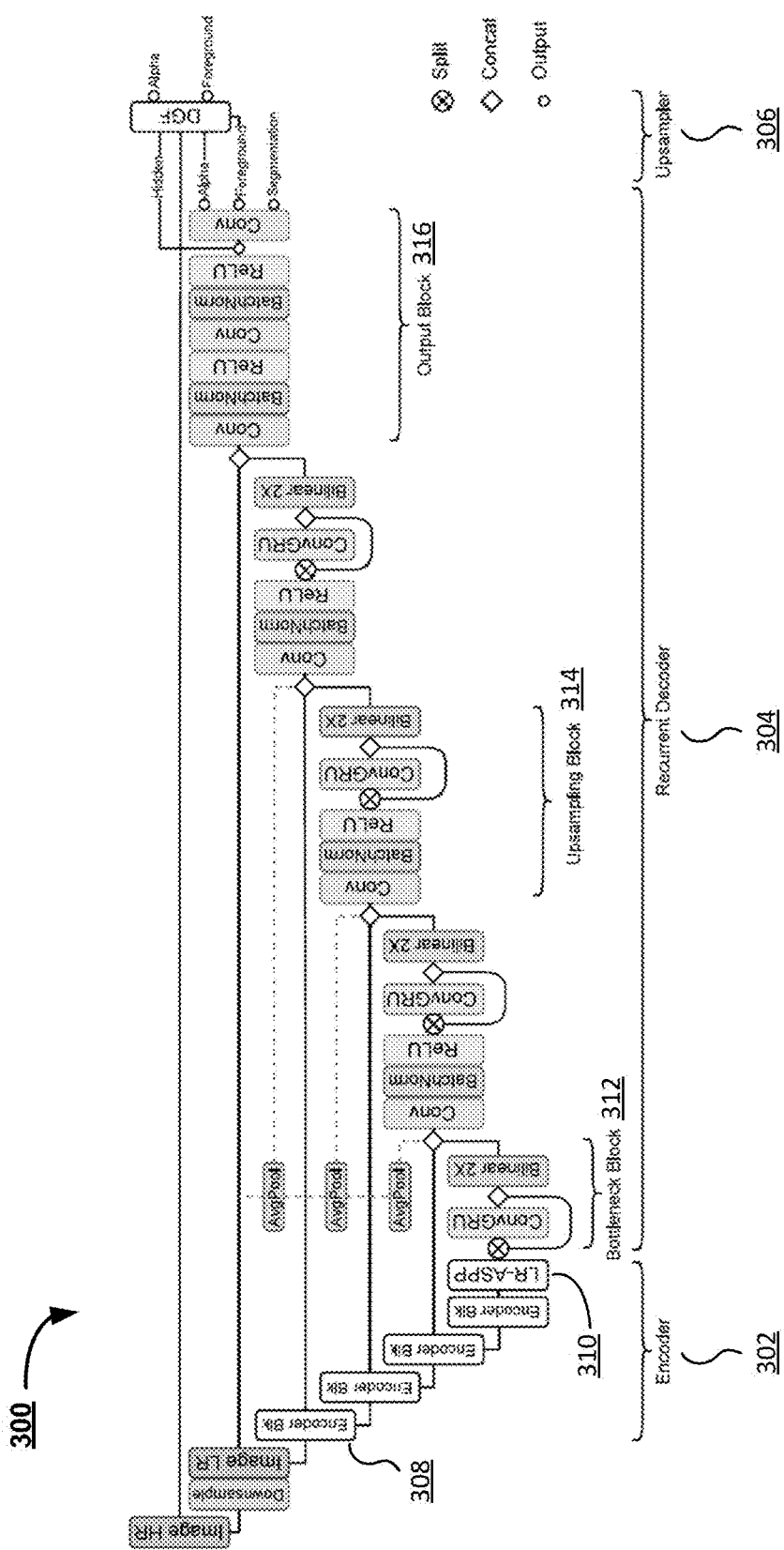
FIG. 3 shows an example architecture of video matting model that may be used in accordance with the present disclosure.

FIG. 3 illustrates an example architecture 300 of an IVM model (e.g., the IVM model 110). The architecture 300 may comprise an encoder 302, a recurrent decoder 304, and a upsampler 306. The upsampler 306 is optional. In the architecture 300, the operation ⓧ represents split, the operation ◇ represents concatenation, and the operation ○ represents output.

The IVM model with the architecture 300 may process high-resolution images and low-resolution images. The input high-resolution image (e.g., Image HR in architecture 300) may be first downsampled to generate a low-resolution variant (e.g., Image LR in architecture 300), then be encoded using a plurality of encoder blocks 308. The input low-resolution image may be encoded using a plurality of encoder blocks 308 without downsampling. Each of the encoder blocks 308 may comprise convolution and pooling layers. At the end of the last encoder block 308, a Lite Reduced Atrous Spatial Pyramid Pooling (LR-ASPP) module 310 may be used to gather features in different resolutions. After the feature encoding, the recurrent decoder 304 may use a plurality of ConvGRU modules (e.g., ConvGRU in architecture 300) to incorporate temporal information extracted from previous frames. After each ConvGRU module, the feature map is upscaled using bilinear sampling (e.g., Bilinear 2X in architecture 300) and concatenated with features in the encoder blocks 308. Then, a convolution (e.g., Cony in architecture 300) followed by Batch Normalization (e.g., BatchNorm in architecture 300) and Rectified Linear Unit (e.g., ReLU in architecture 300) activation may be applied to perform feature merging and channel reduction. Finally, the optional upsampler module 306 may be used to refine details of the output mask for the purpose of high-resolution prediction.

The encoder 302 may comprise a plurality of encoder blocks 308 and a Lite Reduced Atrous Spatial Pyramid Pooling (LR-ASPP) module 310. The encoder blocks 308 may use MobileNetV3-Large as an efficient backbone. The MobileNetV3-Large backbone may operate on each frame in the video and extract feature maps of $E_k$ channels at $$k \in \left[\frac{1}{2}, \frac{1}{4}, \frac{1}{8}, \frac{1}{16}\right]$$

scales. The last block of the encoder blocks 308 may use dilated convolutions, for example, a dilation rate of 2. Downsampling stride may not be needed, i.e., the value of stride may be 1. The last feature map $$E_{\frac{1}{16}}$$

may be given to the LR-ASPP module 310. The LR-ASPP module 310 may compress the last feature map $$E_{\frac{1}{16}}$$

to AS channels. The LR-ASPP module 310 may follow the MobileNetV3-Large backbone for semantic segmentation tasks. The encoder 302 may operate on individual frames and extract features of each frame in a video at ½, ¼, ⅛, and ¹⁄₁₆ scales for the recurrent decoder 304.

The recurrent decoder 304 may adopt ConvGRU module at multiple scales to aggregate temporal information. Compared to deep convolutional long short-term memory (ConvLSTM), the ConvGRU module is more parameter efficient by having fewer gates. The ConvGRU module may be defined as:

$$z_t = \sigma(w_{zx} * x_t + w_{zh} * h_{t-1} + b_z) \quad \text{Equation 2}$$

$$r_t = \sigma(w_{rx} * x_t + w_{rh} * h_{t-1} + b_r) \quad \text{Equation 2}$$

$$o_t = \tanh(w_{ox} * x_t + w_{oh} * (r_t \odot h_{t-1}) + b_o) \quad \text{Equation 4}$$

$$h_t = z_t \odot h_{t-1} + (1 - z_t) \odot o_t, \quad \text{Equation 5}$$

wherein operators * and ⊙ represent convolution and element-wise product, respectively; tanh and σ represent hyperbolic tangent and sigmoid function, respectively; w and b are the convolution kernel and the bias term; the hidden state $h_1$ is used as both the output and the recurrent state to the next time step as $h_{t-1}$. The initial recurrent state $h_0$ is an all zero tensor.

As shown in FIG. 3, the recurrent decoder 304 may comprise bottleneck block 312, upsampling block 314, and output block 316. The bottleneck block 312 may operate at the ¹⁄₁₆ feature scale after the LR-ASPP module 310. In the bottleneck block 312, a ConvGRU layer may be operated on only half of the channels by split and concatenation. This may significantly reduce parameters and computation since the ConvGRU is computationally expansive. Each ConvGRU module may be followed by bilinear sampling (e.g., Bilinear 2X in architecture 300) to upscale the feature map.

The recurrent decoder 304 might have a plurality of upsampling blocks 314. The upsampling block 314 may be repeated at the ⅛, ¼, and ½ feature scale. First, the upsampling block 314 may concatenate the bilinearly upsampled output (e.g., Bilinear 2X in architecture 300) from the bottleneck block 312, the feature map of the corresponding scale from the encoder 302, and the input image downsampled by repeated 2×2 average pooling. Then, a convolution (e.g., Conv in architecture 300) followed by Batch Normalization (e.g., BatchNorm in architecture 300) and Rectified Linear Unit (e.g., ReLU in architecture 300) activation may be applied to perform feature merging and channel reduction. Finally, a ConvGRU module may be applied to half of the channels by split and concatenation.

The output block 316 may not use ConvGRU which is expansive and not impactthl at this scale. The output block 316 may only use regular convolutions to refine the results. The output block 316 may first concatenate the input image and the bilinearly upsampled output (Bilinear 2X) from the upsampling block 314. Then, the output block 316 may use 2 repeated stacks to produce the final hidden features. The stack may comprise convolution (e.g., Cony in architecture 300), Batch Normalization (e.g., BatchNorm in architecture 300), and ReLU. Finally, the features may be projected to outputs, including 1-channel alpha prediction, 3-channel foreground prediction, and 1-channel segmentation prediction. The segmentation output may be used for the segmentation training objective.

It might be effective and efficient by applying the ConvGRU module on half of the channels by split and concatenation. This design may help the ConvGRU module to focus on aggregating temporal information, while the other split branch may forward the spatial features specific to the current frame.

Furthermore, the IVM model using the architecture 300 may be modified to be given T frames at once as input and each layer may process all T frames before passing to the next layer. During training, this may allow Batch Normalization to compute statistics across both batch and time to ensure the normalization is consistent. During inference, T=1 can be used to process live videos. If the frames may be allowed to be buffered, T>1 can be used to utilize more GPU parallelism from the non-recurrent layers as a form of batching.

All ConvGRU layers may operate on half of the channels by split and concatenation, so the recurrent hidden state has $$\frac{D_k}{2}$$

channels at scale K. For the upsampling blocks 314, the convolution, Batch Normalization, and ReLU stack compress the concatenated features to $D_k$ channels before splitting to the ConvGRU model. For the output block 316, the first two convolutions may have 16 filters and the final hidden features may have 16 channels. The final projection convolution outputs 5 channels, including 3-channel foreground, 1-channel alpha, and 1-channel segmentation predictions. All convolutions may use 3×3 kernels, except the last projection convolution may use a 1×1 kernel. The average poolings may use 2×2 kernels with a stride of 2. In additional, the recurrent decoder 304 may be unidirectional so it may be used for both live streaming and post-processing.

The upsampler 306 may use Deep Guided Filter (DGF) module for high-resolution upsampling. The DGF module may be optional and the encoder-decoder network can operate standalone when the input frame is low in resolution. When processing high-resolution videos, such as 4K and HD, the input frame may be downsampled by a factor s before passing through the encoder-decoder network. Then, the low-resolution alpha, foreground, final hidden features, as well as the high-resolution input frame may be provided to the DGF module to produce high-resolution alpha and foreground. In one embodiment, the DGF module may contain a plurality of 1×1 convolutions internally. The DGF module may be modified to take the predicted foreground, alpha, and the final hidden features as inputs. All internal convolutions may use 16 filters.

In one embodiment, the IVM model which utilizes the architecture 300 may be built and trained in PyTorch. The alpha and foreground prediction outputs may be clamped to [0, 1] range without activation functions. The clamp may be done during both training and inference. The segmentation prediction output is sigmoid logits.

Figure 7:
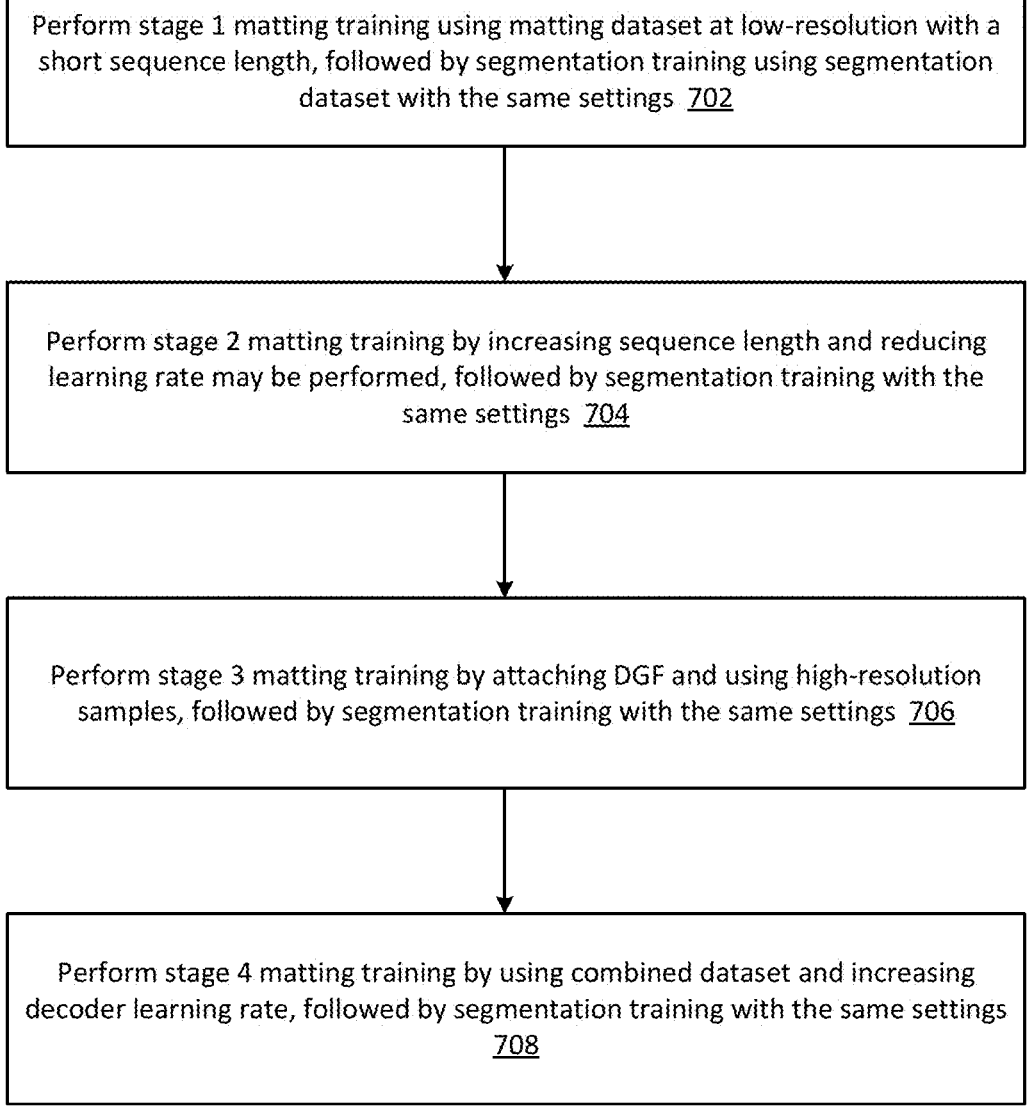
FIG. 7 shows an example method for training the video matting model with matting dataset.

Using the architecture 300, the features may be refined in a coarse-to-fine process and temporal information from different resolutions may be extracted and incorporated. The IVM model using the architecture 300 may be trained end-to-end as shown in FIG. 7.

Figure 4:
FIG. 4 shows an example table illustrating the video matting network.

FIG. 4 shows an example table illustrating the IVM network (i.e., "Ours") and its large variant (i.e., "Ours Large") with feature channels. In table 700, $E_k$ represents encoder channels at k feature scale. $D_k$ represents decoder channels at k feature scale. k can be $$\frac{1}{2}, \frac{1}{4}, \frac{1}{8}, \text{ or } \frac{1}{16}.$$

AS represents LR-ASPP channels. In one embodiment, the video matting network uses MobileNetV3-Large backbone and the large variant uses ResNet50 backbone.

FIG. 5 illustrates an example process 500 performed by an IVM model (e.g., the IVM model 110). The IVM model may perform the process 500 to detect and extract a foreground object (e.g., a human being) from any video frame, such as a video created for uploading to the video service 112. Although depicted as a sequence of operations in FIG. 5, those of ordinary skill in the art will appreciate that various embodiments may add, remove, reorder, or modify the depicted operations.

The IVM model described above may be used to locate and extract a foreground object from a video. At 502, features may be extracted from each frame of a video by an encoder of a model. The video may comprise a plurality of frames. Any particular frame of the video may comprise a foreground object, for example, a human being. The video may be low-resolution or high-resolution. If the video is high-resolution, each frame of the high-resolution video may be first downsampled to generate a low-resolution variant. Then, each frame may be encoded by a plurality of encoder blocks. The features extracted from a particular frame may include color-based features, texture-based features, shape-based features, and semantic features, such as the object. The extracted features of each frame in a video may be fed into the decoder.

At 504, a decoder of the IVM model may incorporate temporal information into any particular frame. The temporal information may be extracted from one or more frames previous to the particular frame. The particular frame and the one or more previous frames are among the plurality of frames of the video. In an embodiment, the decoder is a recurrent decoder. The recurrent decoder may aggregate temporal information extracted from previous frames at multiple scales, for example, at ½, ¼, ⅛, and 1/16 scales. The recurrent decoder may aggregate temporal information and merge the extracted features of the input frames. The recurrent decoder may be unidirectional so it may be used for both live streaming and post-processing.

At 506, the IVM model may generate a representation of a foreground object included in the particular frame. For example, the representation of the foreground object may be generated based on the concatenation of features, e.g., a feature map. The feature map may be a topographical representation of the unique features in the particular frame. The IVM model may have been trained using segmentation dataset and matting dataset. The segmentation training with segmentation dataset and matting training with matting dataset may be interleaved in the training process.

Figure 6:
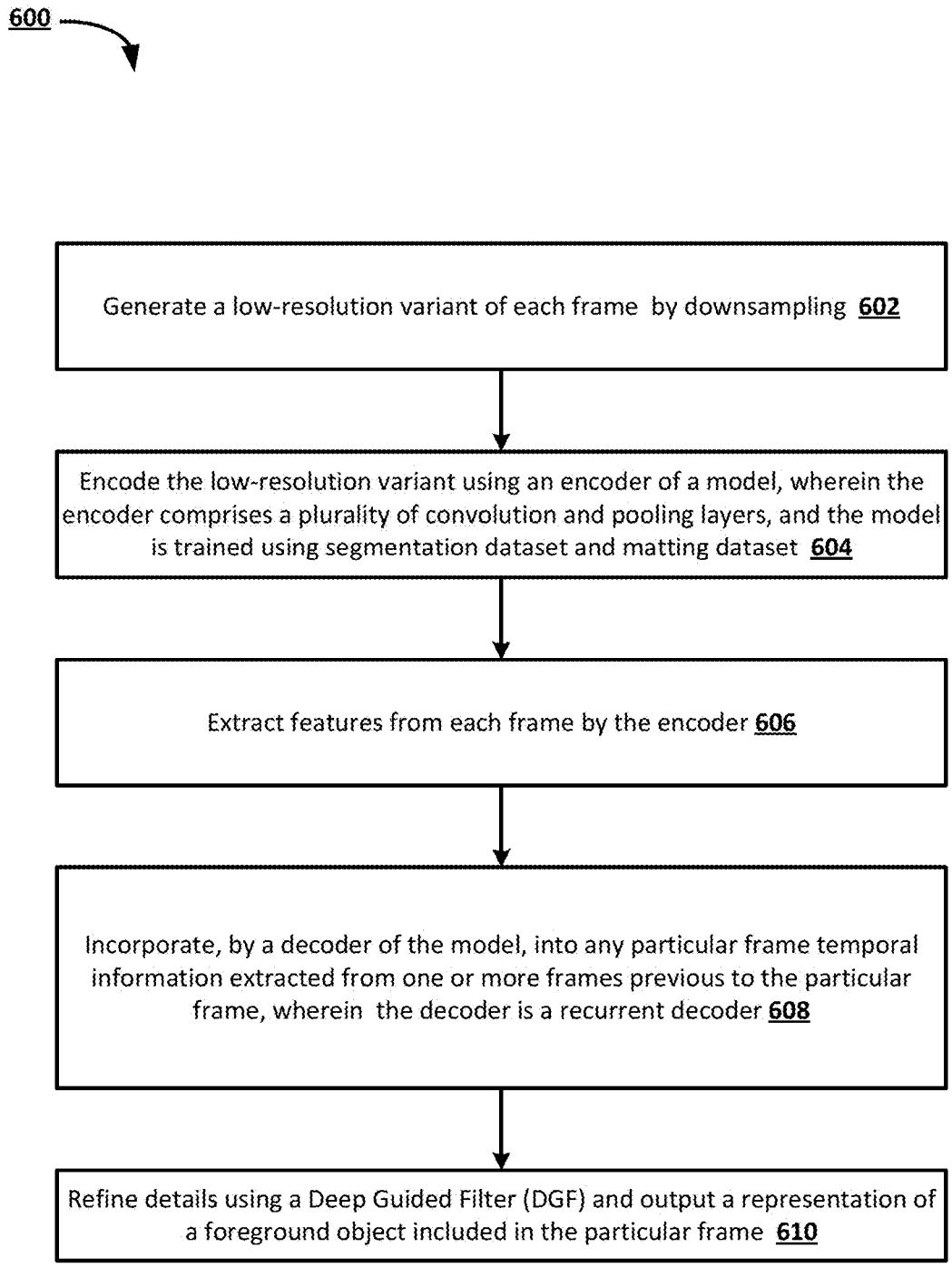
FIG. 6 shows an example method performed by a video matting model that may be used in accordance with the present disclosure.

FIG. 6 illustrates an example process 600 performed by an IVM model (e.g., the IVM model 110). The IVM model may perform the process 600 to extract a foreground object (e.g., a human being) from any video frame. Although depicted as a sequence of operations in FIG. 6, those of ordinary skill in the art will appreciate that various embodiments may add, remove, reorder, or modify the depicted operations.

The IVM model described above may process low-resolution image and high-resolution image, such as 4K and HD. The low-resolution image may be encoded directly without downsampling. However, the high-resolution image may be first downsampled to generate a low-resolution variant before the image is encoded. At 602, a low-resolution variant of each frame of a video may be generated by downsampling each frame.

At 604, the low-resolution representative may be encoded using an encoder of a IVM model. The IVM model has been trained using segmentation dataset and matting dataset. The encoder may be a feature encoder and receive one or more input video frames. For example, the encoder may receive some or all of the video frames included in a particular video. Each frame may be encoded by a plurality of encoder blocks. The encoder may comprise a plurality of convolution and pooling layers.

At 606, features may be extracted from each frame by the encoder of the IVM model. The video may comprise a plurality of frames. Any particular frame of the video may comprise a foreground object, for example, a human being. The features extracted from a particular frame may include color-based features, texture-based features, shape-based features, and semantic features, such as the object. The extracted features of each frame may be fed into a decoder of the IVM model.

At 608, the decoder of the IVM model may incorporate temporal information into any particular frame. The temporal information may be extracted from one or more frames previous to the particular frame. The particular frame and the one or more previous frames are among the plurality of frames of the video. In an embodiment, the decoder is a recurrent decoder. The recurrent decoder may adopt a plurality of ConvGRU modules and aggregate temporal information extracted from previous frames at multiple feature scales, for example, at ½, ¼, ⅛, and 1/16 feature scales. The recurrent decoder may aggregate temporal information and merge the extracted features of the input frame. The recurrent decoder may be unidirectional so it may be used for both live streaming and post-processing.

At 610, a Deep Guided Filter (DGF) module may be used to refine details of an output mask. The DGF module is optional. The encoder-decoder network of the IVM model can operate standalone when an input video frame has a low resolution. When processing a high-resolution video, such as 4K and HD, the input frame may be downsampled before passing through the encoder-decoder network. Then, the low-resolution alpha, foreground, final hidden features, as well as the high-resolution input frame may be provided to the DGF module to produce high-resolution alpha and foreground. In one embodiment, the DGF module may contain a plurality of 1×1 convolutions internally. Additionally, the DGF module may be modified to take the predicted foreground, alpha, and the final hidden features as inputs. The IVM model may output a representation of a foreground object included in any particular frame (i.e., output mask). For example, the representation of the foreground object may be generated based on concatenation of features, e.g., a feature map.

The IVM techniques described in the present disclosure implement a training process using both matting dataset and segmentation dataset because of the following reasons. First, certain video matting tasks (e.g., human matting tasks) are closely related to segmentation tasks (e.g., human segmentation tasks). Trimap-based and background-based matting techniques may be given additional cues as inputs. Video matting models for implementing human matting tasks must learn to semantically understand the scene and be robust in locating the human subjects. Second, most existing matting datasets only provide ground-truth alpha and foreground to be synthetically composited to background images. The compositions sometimes look fake due to the foreground and the background having different lighting. On the other hand, semantic segmentation datasets feature real images where the human subjects are included in all types of complex scenes. Thus, training a video matting model using semantic segmentation datasets may prevent the model from overfitting to the synthetic distribution. In addition, there are much more training data available for semantic segmentation tasks. A variety of publicly available datasets, both video-based and image-based, can be used to train a robust IVM model. It is meaningful that the vast segmentation data may be incorporated into a training process. Training a model using both matting dataset and segmentation dataset may considerably improve the performance of the trained model.

The segmentation training using segmentation dataset and the matting training using matting dataset may be implemented alternately in the training process. In some examples, the IVM model may be trained using image segmentation data after every odd iteration and be trained using video segmentation data after every even iteration. For the segmentation training, video segmentation dataset, YouTubeVIS, may be utilized and 2985 video clips containing humans may be selected. Image segmentation datasets COCO and SPD may also be used. The COCO dataset provides 64,111 images containing humans while the SPD dataset provides additional 5711 samples. Motion augmentations may not be provided since the YouTubeVIS dataset already contains large camera movements and the image segmentation datasets do not require motion augmentation.

For video segmentation data, the same B, T, h, w settings are following every matting training stage. The image segmentation data may be treated as video sequences of only 1 frame, which means sequence length T'=1. So, there is room to apply a larger batch size B'=B×T. Since the images are feedforwarded as the first frame, it forces the segmentation to be robust even in the absence of recurrent information.

In one embodiment, the IVM model may be trained on VideoMatte240K (VM), Distinctions-646 (D646), and Adobe Image Matting (AIM) datasets. VM is a video matting dataset and can provide 484 4K/HD video clips. The VM dataset may be divided into 475/4/5 clips for training/validation/testing splits. Both D646 and AIM are image matting datasets. Only images of humans may be used for the matting training. The images of humans may be combined to form 420/15 training/validation splits. For evaluation, D646 provides 11 test images, and AIM provides 10 test images.

For backgrounds, HD background videos may be used. The videos may include a variety of motions, such as cars passing, leaves shaking, and camera movements. 3118 clips that do not contain humans may be selected, and the first 100 frames from every clip may be extracted. 8000 image backgrounds may also be selected. The images have more indoor scenes, such as offices and living rooms.

Motion and temporal augmentations may be applied on both foreground and background to increase data variety. Motion augmentations include affine translation, scale, rotation, sheer, brightness, saturation, contrast, hue, noise, and blur that change continuously over time. The motion is applied with different easing functions such that the changes are not always linear. The augmentation also adds artificial motions to the image datasets. Additionally, temporal augmentation may be applied on videos, including clip reversal, speed changes, random pausing, and frame skipping. Other discrete augmentations, such as horizontal flip, grayscale, and sharpening, are applied consistently to all frames.

To save training time, the training process may be designed to let the IVM model progressively see longer sequences and higher resolutions. Adam optimizer may be used for training. FIG. 7 shows an exemplary process 700 for training a video matting model with both matting dataset and segmentation dataset. The matting training may be pipelined into four stages and designed to let the network progressively see longer sequences and higher resolutions to save training time. In one example, Adam optimizer may be used for training. By way of example and without limitation, all stages may use batch size B=4 split across 4 Nvidia V100 32G GPUs. Following each stage of the matting training, the segmentation training may be performed using the same settings as each corresponding matting training stage.

At 702, stage 1 matting training at low-resolution with a short sequence length may be performed, followed by segmentation training using the same settings as stage 1 of the matting training. The segmentation training may be interleaved between every matting training iteration. The IVM model may be trained with image segmentation data after every odd iteration and be trained with video segmentation data after every even iteration. In one embodiment, the IVM model is trained with VM dataset at low-resolution without the DGF module for 15 epochs. A short sequence length T=15 frames is set, so that the video matting network can get updated quicker. The MobileNetV3 backbone is initialized with pre-trained ImageNet weights and uses $1e^{-4}$ learning rate, while the rest parts of the network use $2e^{-4}$ learning rate. The training samples the height (h) and width (w) of the input resolution independently between 256 and 512 pixels. This makes the video matting network robust to different resolutions and aspect ratios.

At 704, stage 2 matting training by increasing sequence length and reducing learning rate may be performed, followed by segmentation training using the same settings as stage 2 matting training. In one example, the sequence length T may be increased to 50 frames. The segmentation training may be interleaved between every matting training iteration. The IVM model may be trained with image segmentation data after every odd iteration and be trained with video segmentation data after every even iteration. In one embodiment, the IVM model is trained with VM dataset at low-resolution without the DGF module for 2 epochs. A sequence length T=50 frames is set, which allows the network to see longer sequences and learn long-term dependencies. T=50 is the longest sequence length that can be fit on the GPUs in the matting training. The MobileNetV3 backbone is initialized with pre-trained ImageNet weights and uses $0.5e^{-4}$ learning rate, while the rest parts of the network use $1e^{-4}$ learning rate. The matting training samples the height (h) and width (w) of the input resolution independently between 256 and 512 pixels.

At 706, stage 3 matting training by attaching DGF and using high-resolution samples may be performed, followed by segmentation training using the same settings as stage 3 matting training. In one example, the IVM model may be trained with video matting dataset VM at high-resolution with DGF module. The segmentation training may be interleaved between every matting training iteration. The IVM model may be trained with image segmentation data after every odd iteration and be trained with video segmentation data after every even iteration. For example, the IVM model may be trained with VM dataset at high-resolution for 1 epoch. Since high resolution consumes more GPU memory, the sequence length should be set to very short. To avoid the recurrent network overfitting to very short sequences, the IVM model may be trained using both low-resolution long sequences and high-resolution short sequences. Specifically, the low-resolution pass does not employ DGF and has a sequence length T=40 and h, w~(256, 512). The high-resolution pass entails the low-resolution pass and employs DGF with downsample factor s=0.25, T̂=6 and ĥ, ŵ~(1024, 2048). The learning rate of DGF is set to $2e^{-4}$ and the rest of the network has a learning rate of $1e^{-5}$.

At 708, stage 4 matting training with combined dataset and increased decoder learning rate may be performed, followed by segmentation training using the same settings as stage 4 matting training. In one example, the combined dataset of D646 and AIM may be used for training the network for 5 epochs. The segmentation training may be interleaved between every matting training iteration. The IVM model may be trained with image segmentation data after every odd iteration and be trained with video segmentation data after every even iteration.

To avoid the recurrent network overfitting to very short sequences, the IVM model may be trained using both low-resolution long sequences and high-resolution short sequences. Specifically, the low-resolution pass does not employ DGF module and has a sequence length T=40 and h, w~(256, 512). The high-resolution pass entails the low-resolution pass and employs DGF with downsample factor s=0.25, T̂=6 and ĥ, ŵ~(1024, 2048). The learning rate of DGF module is set to $2e^{-4}$. The decoder learning rate is increased to $5e^{-5}$ to let the network adapt. The learning reate of the rest of the network is set to $1e^{-5}$.

Moreover, a variety of loss terms may be used to train the video matting model. L1 loss and Laplacian loss may be used on the matting mask. A temporal coherence loss may be applied to enforce temporal consistency as well. In additional, a foreground prediction loss to predict color information of the foreground object may be used. These loss terms should be jointly used to improve the accuracy of the video matting model. If any loss term is excluded from the framework, the completeness of the model training may not be affected while the performance of the model may be impacted.

The losses may be applied on all t∈[1, T] frames. To learn alpha $\alpha_t$ w.r.t. ground-truth $\alpha^*_t$, L1 loss $L_{l1}^\alpha$ and pyramid Laplacian loss $L_{lap}^\alpha$ may be utilized to produce the best result. A temporal coherence loss $L_{tc}^\alpha$ may also be used to reduce flicker. L1 loss $L_{l1}^\alpha$, pyramid Laplacian loss $L_{lap}^\alpha$, and temporal coherence loss $L_{tc}^\alpha$ may be defined in Equation 6, Equation 7, and Equation 8, respectively:

$$L_{l1}^\alpha = \|\alpha_t - \alpha_t^*\|_1, \quad \text{Equation 6}$$

$$L_{lap}^\alpha = \sum_{s=1}^{5} \frac{2^{s-1}}{5} \|L_{pyr}^s(\alpha_t) - L_{pyr}^s(\alpha_t^*)\|_1, \quad \text{Equation 7}$$

$$L_{tc}^\alpha = \left\|\frac{d\alpha_t}{dt} - \frac{d\alpha_t^*}{dt}\right\|_2, \quad \text{Equation 8}$$

To learn foreground $F_t$ w.r.t. ground-truth $F^*_t$, L1 loss $L_{l1}^F$ and temporal coherence loss $L_{tc}^F$ on pixels where $\alpha^*_t > 0$ are computed using the following equations:

$$L_{l1}^F = \|(\alpha^*_t > 0)*(F_t - F^*_t)\|_1, \quad \text{Equation 9}$$

$$L_{tc}^F = \left\|(\alpha^*_t > 0)*\left(\frac{dF_t}{dt} - \frac{dF^*_t}{dt}\right)\right\|_2, \quad \text{Equation 10}$$

The total matting loss may be as follows:

$$L^M = L_{l1}^\alpha + L_{lap}^\alpha + 5L_{tc}^\alpha + L_{l1}^F + 5L_{tc}^F, \quad \text{Equation 11}$$

For semantic segmentation, the video matting model is only trained on the human category. To learn the segmentation probability $S_t$ w.r.t. the ground-truth binary label $S^*_t$, the binary cross entropy loss is defined in Equation 12:

$$L^S = S^*_t(-\log(S_t)) + (1 - S^*_t)(-\log(1 - S_t)), \quad \text{Equation 12}$$

FIG. 8 illustrates an example training procedure that may be used in the present disclosure. Graph 800 shows the training loop of the training strategy. The segmentation training is interleaved between every matting training iteration. The video matting model is trained with image segmentation data after every odd iteration, and trained with video segmentation data after every even iteration. Segmentation training is applied to all stages. For video segmentation data, the same B, T, h, w settings are following every matting stage. The image segmentation data may be treated as video sequences of only 1 frame, which means sequence length T'=1. So, there is room to apply a larger batch size B'=B×T. Since the images are feedforwarded as the first frame, it forces the segmentation to be robust even in the absence of recurrent information.

In one embodiment, the sequence length parameters T and T̂ may be set according to the stages. For example, at stage 1 as shown in FIG. 7, the sequence length is 15. At stage 2, the sequence length is 50. The batch size parameters may be set to B=4, and B'=B×T. The input resolutions are randomly sampled as h, w~Uniform(256, 512) and ĥ, ŵ~Uniform (1024, 2048). The video matting network may be trained using 4 Nvidia V100 32G GPUs. Mixed precision training may be used to reduce the GPU memory consumption. The training takes approximately 18, 2, 8, and 14 hours at each stage, respectively. To review the performance of the IVM model, the benchmark is constructed by compositing each test sample from VM, D646, and AIM datasets onto 5 video and 5 image backgrounds. Every test clip has 100 frames. Image samples are applied with motion augmentation.

The video matting method is compared against the trimap-based method (FBA), background-based method (BGMv2 with MobileNetV2 backbone), and auxiliary-free method (MODNet). To fairly compare the models for fully automatic matting, FBA uses synthetic trimaps generated by dilation and erosion of semantic segmentation method DeepLabV3 with ResNet101 backbone; BGMv2 only sees the first frame's ground-truth background; MODNet applies its neighbor frame smoothing trick. MODNet uses its official weights; BGMv2 is already trained on all three datasets.

The α w.r.t. ground-truth α* is evaluated using Mean Absolute Difference (MAD), Mean Squared Error (MSE), spatial gradient (Grad), and connectivity (Conn) for quality, and adopt dtSSD for temporal coherence. For F, pixels are only measured where α*>0 by MSE. MAD and MSE are scaled by $1e^3$ and dtSSD is scaled by $1e^2$ for better readability. F is not measured on VM since it contains noisy ground-truth. MODNet does not predict F, the evaluation is implemented on the input frame as its foreground prediction. This simulates directly applying the alpha matte on the input.

FIG. 9 illustrates a table 900 depicting a comparison of the performance of the IVM model with the performance of the existing video matting models using a plurality of benchmark datasets. VM indicates VideoMatte240K dataset which is a video matting dataset. D646 indicates Distinctions-646 dataset, and AIM indicates Adobe Image Matting dataset. Both D646 and AIM are image matting datasets. MAD represents Mean Absolute Difference. MSE represents Mean Squared Error. GRAD represents spatial gradient. Conn represents connectivity. dtSSD is a temporal coherence metric. In table 900, the existing video matting models that are used for comparison are DeepLabV3, FBA, BGMv2, and MODNet, respectively.

The comparison uses low-resolution input. DGF module is not included in the IVM model. Compared to the existing video matting models, the IVM model (i.e., "Ours") predicts more accurate and consistent alpha across all datasets. In particular, FBA is limited by the inaccurate synthetic trimap. BGMv2 performs poorly for dynamic backgrounds. MODNet produces less accurate and coherent results than the IVM model. For foreground prediction, the IVM model is behind BGMv2 but outperforms FBA and MODNet. Noticeably, FBA uses synthetic trimap from DeepLabV3. BGMv2 only sees ground-truth background from the first frame. MODNet does not predict foreground so it is evaluated on the input image.

FIG. 10 illustrates a table 1000 depicting a comparison of the performance of the IVM model with the performance of the existing MODNet model using a plurality of benchmark datasets. Since DGF must be trained end-to-end with the network, the MODNet model is modified to use non-learned Fast Guided Filter (FGF) to upsample the prediction. The comparison uses high-resolution input. Both methods use downsample scale s=0.25 for the encoder-decoder network. Conn metric is removed because it is too expansive to compute at high resolution. The table 1000 indicates that the IVM model (i.e., "Ours") performs better than the existing modified MODNet model on all the three benchmark datasets, i.e., VM, D646, and AIM.

Figure 11:
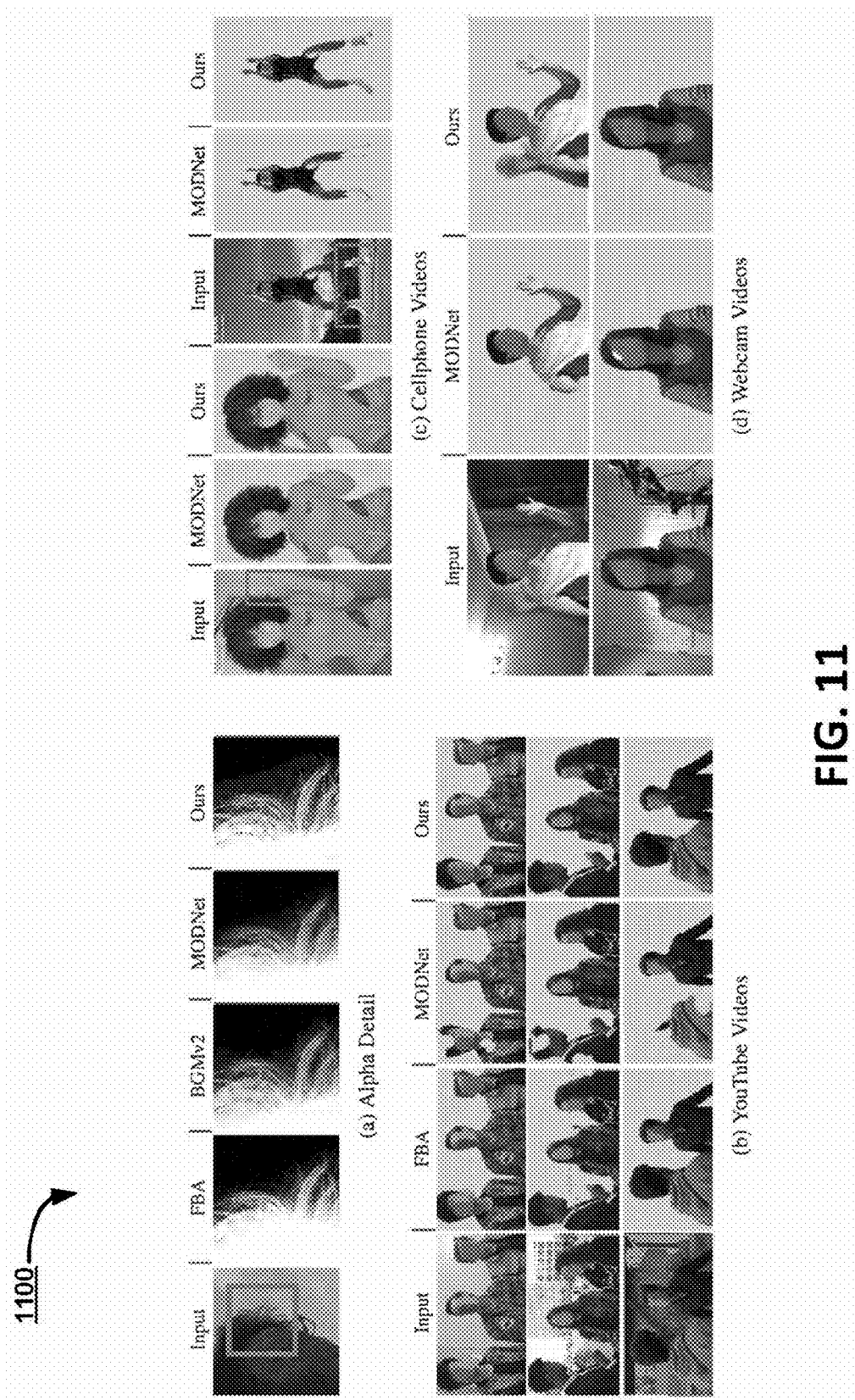
FIG. 11 shows an example graph illustrating a comparison of the performance of various models, including models in accordance with the present disclosure.

FIG. 11 illustrates a graph 1100 depicting a comparison of the performance of the IVM model with the performance of the existing video matting models. The graph 1100 shows qualitative comparisons on real videos, for example, cellphone videos, YouTube videos, and webcam videos. In FIG. 11(a), alpha predictions are compared across all methods. The IVM model (i.e., "Ours") achieves higher performance in detail. For example, it predicts fine-grained details like hair strands more accurately. In FIG. 11(b), random YouTube videos are selected as input. BGMv2 is removed from the comparison since these videos do not have pre-captured backgrounds. The video matting model as described above (i.e., "Ours") is much more robust to semantic errors. In FIG. 11(c) and FIG. 11(d), real-time matting is further compared against MODNet using cellphone videos and webcam videos. The IVM model can handle fast-moving body parts better than MODNet.

Figure 12:
FIG. 12 shows an example table illustrating a comparison of the size of various models, including models in accordance with the present disclosure.

FIG. 12 illustrates a table 1200 depicting a comparison of the size of the IVM model with the size of the existing video matting models. The table 1200 shows that the video matting method described above (i.e., "Ours") is significantly lighter, with only 58% parameters compared to MODNet. Size is measured on FP32 weights in the methods for comparison.

Figure 13:
FIG. 13 shows an example table illustrating a comparison of the speed of various models, including models in accordance with the present disclosure.

FIG. 13 illustrates a table 1300 depicting a comparison of the speed of the IVM model with the speed of the existing video matting models. In the table 1300, s represents the down-sample scale. Models are converted to TorchScript and optimized before testing (BatchNorm fusion etc.). FPS is measured as FP32 tensor throughput on an Nvidia GTX 1080Ti GPU. GMACs is measured using multiply-accumulate operations, but it only measures convolutions and misses out resize and many tensor operations which are used mostly in DGF and FGF. Therefore, GMACs is only a rough approximation.

The video matting method described above (i.e., "Ours") is the fastest on HD (1920×1080), but a little slower than BGMv2 on 512×288 and MODNet with FGF on 4K (3840× 2160). The reason might be that DGF and FGF incur very minor differences in performance. The video matting method described above is slower than MODNet in 4K because it predicts foreground in addition to alpha, which makes it slower to process 3 extra channels in high resolution. The video matting method described above achieves HD 104 FPS and 4K 76 FPS, which is considered real-time for many applications.

Figure 14:
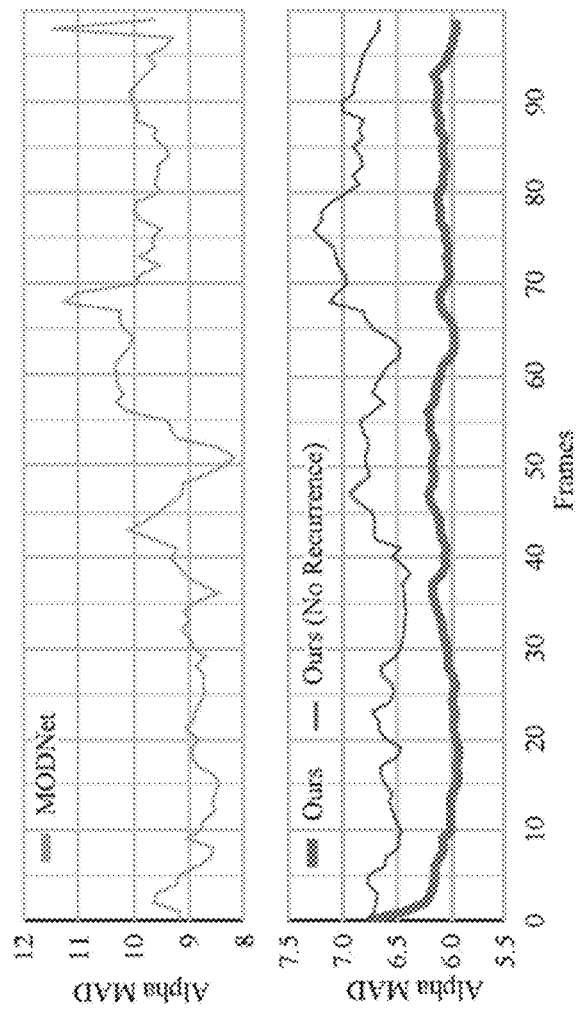
FIG. 14 shows an example graph illustrating a comparison of the performance of various models, including models in accordance with the present disclosure.

FIG. 14 illustrates a graph 1400 depicting a comparison of the performance of the IVM model with the performance of the existing MODNet model using VM dataset. The graph 1400 shows the change of average alpha MAD metric across all VM test clips over time. The error of the IVM model (i.e., "Ours") drops significantly in the first 15 frames, then the metric stays stable. In contrast, MODNet has large fluctuations in the metric even with its neighbor frame smoothing trick.

The comparison is also implemented to the IVM model but without recurrence (i.e., "Ours (No Recurrence)") in the network. Zero tensors are passed as the recurrent states. As expected, the model without recurrence obtains worse quality and consistency than the model with recurrence (i.e., "Ours"). On the contrary, the video matting model with recurrence gets improvement over time and the metric is stable. This proves that temporal information improves quality and consistency.

Figure 15:
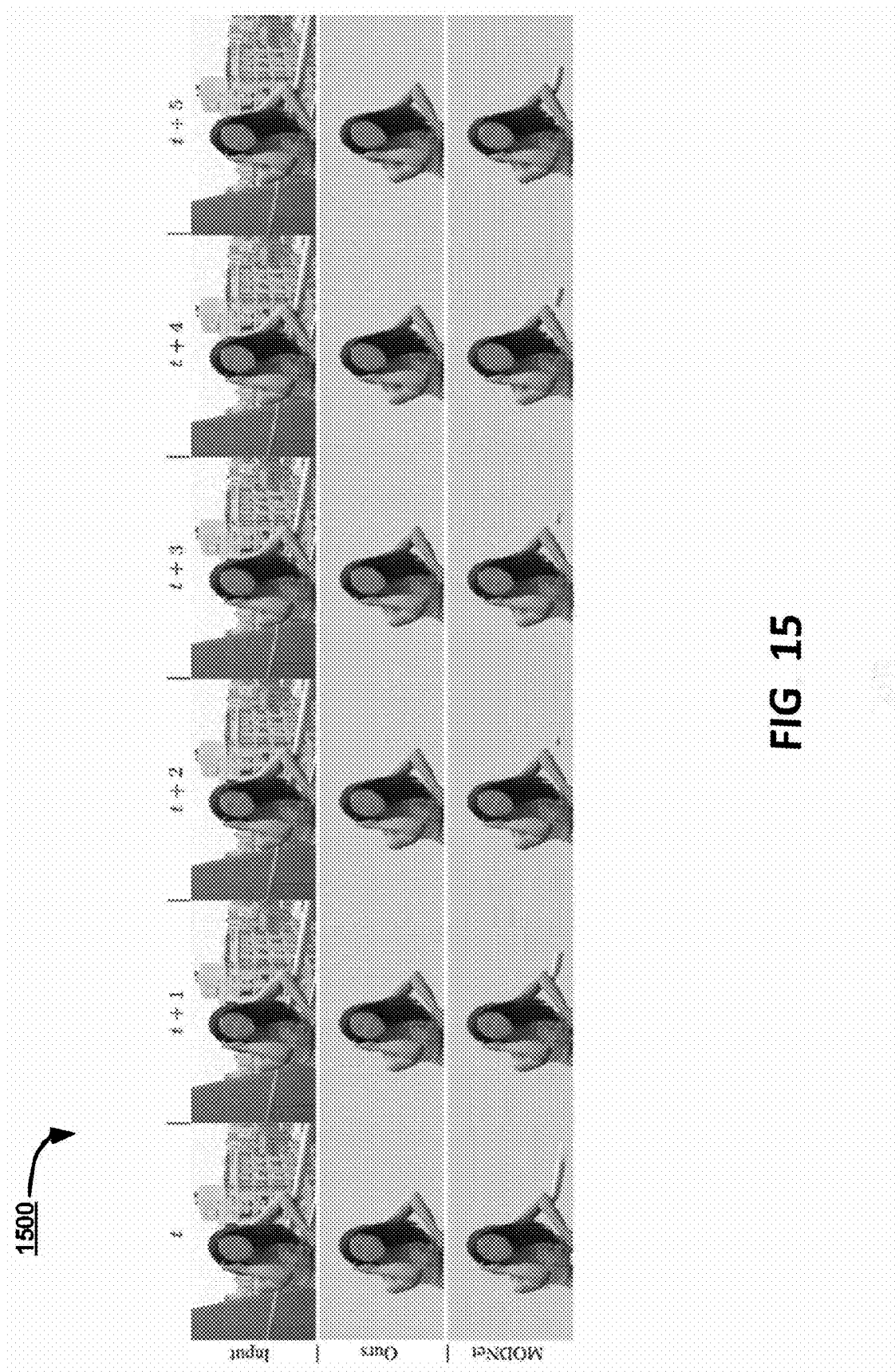
FIG. 15 shows an example graph illustrating a comparison of the performance of various models, including models in accordance with the present disclosure.

FIG. 15 illustrates a graph 1500 depicting a comparison of the performance of the IVM model with the performance of the existing MODNet model. The graph 1500 compares temporal coherence with the MODNet model on a video sample. The IVM model (i.e., "Ours") produces consistent results on the handrail region while the MODNet model produces flicker around the handrail, which significantly degrade perceptual quality. This may be because the MODNet model processes every frame as independent image, which results in its matting decision not consistent.

Figure 16:
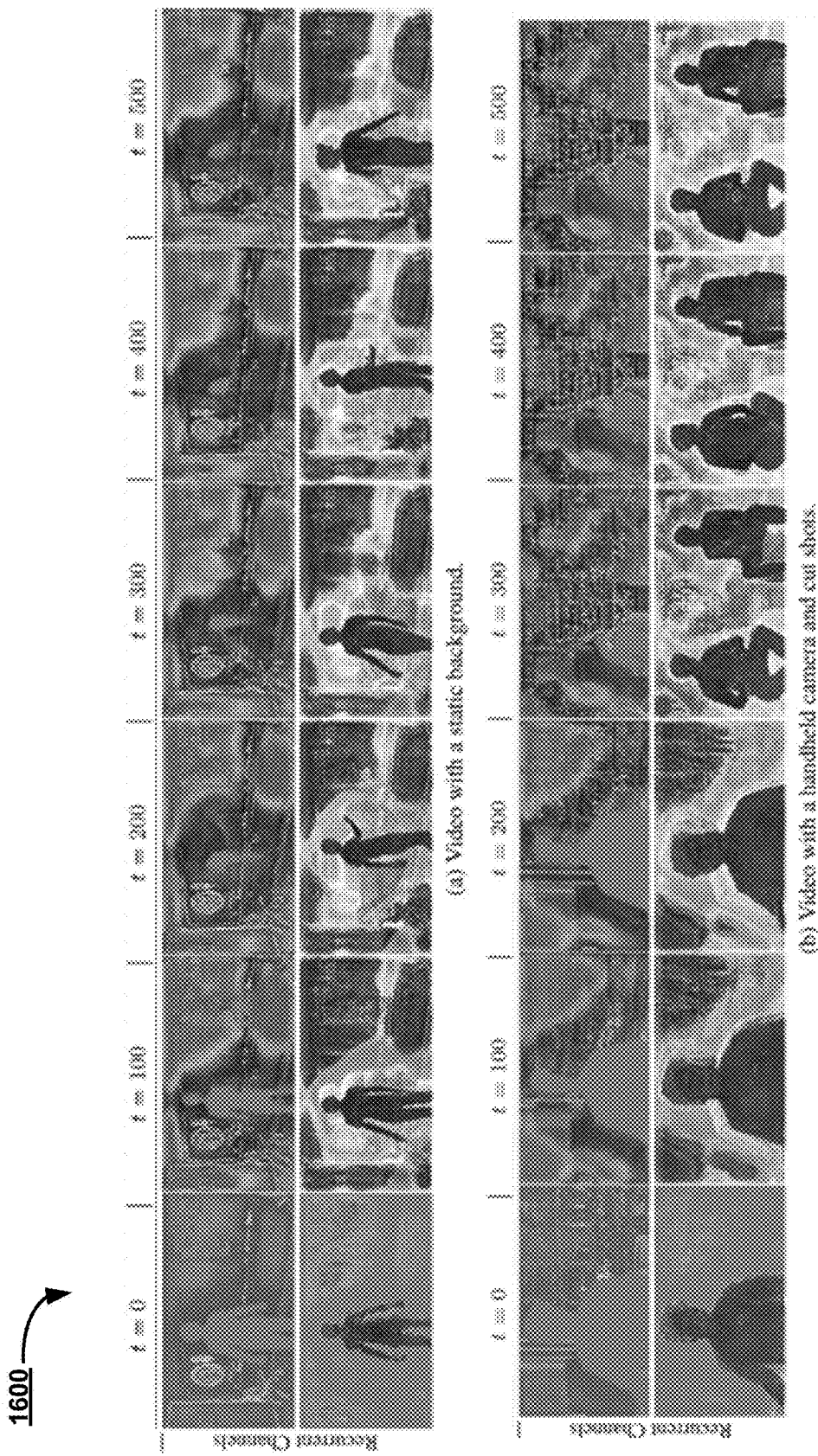
FIG. 16 shows an example graph illustrating the performance of the techniques described in the present disclosure.

FIG. 16 illustrates a graph 1600 depicting examples of recurrent hidden state. The graph 1600 shows that the IVM model automatically learns to reconstruct the background over time and keep this information in its recurrent channels to help future predictions. It also uses other recurrent channels to keep track of motion history. Furthermore, the model attempts to reconstruct the background when the videos contain camera movements and is capable of forgetting useless memory on shot cuts. It is shown that the model has learned to store useful temporal information in its recurrent state and is capable of forgetting useless information upon shot cuts.

FIG. 17 illustrates a table 1700 depicting a comparison of the segmentation performance of the IVM model with the performance of the existing video matting models. The table 1700 shows that the method described above (i.e., "Ours (segmentation output)") is as robust as the semantic segmentation methods when evaluated on the subset of COCO validation images. The images contain humans and are only in the human category. The method achieves 61.50 mIOU, which is reasonably between the performance of MobileNetV3 and DeepLabV3 trained on COCO considering the difference in model size.

Moreover, the robustness of the alpha output (i.e., "Ours (alpha output)") is evaluated with thresholding $\alpha > 0.5$ as the binary mask. The result of the evaluation achieves 60.88 mIOU, which indicates that the alpha prediction is also robust. For comparison, a separate model is trained by initializing the MobileNetV3 encoder and LR-ASPP module with the pretrained weights on COCO validation set and by removing the segmentation objective. The model (i.e., "Ours (alpha output, no seg objective)") overfits to the synthetic matting data and regresses significantly on COCO performance. The result is 38.24 mIOU. It is shown that training with segmentation objective makes the method robust. However, training only with pre-trained weights regresses.

FIG. 18 illustrates a table 1800 depicting a performance comparison of the method using DGF with the method using FGF. The dataset is D646. The parameters are measured in millions. FPS is measured in HD. The table 1800 shows that DGF (i.e., "Ours") has only a small overhead in size and speed compared to FGF (i.e., "Ours (FGF)"). DGF has a better Grad metric, indicating its high-resolution details are more accurate. DGF also produces more coherent results indicated by the dtSSD metric. It may be because it takes hidden features from the recurrent decoder into consideration. The MAD and MSE metrics are inconclusive because they are dominated by segmentation-level errors, which are not corrected by either DGF or FGF.

Figure 19:
FIG. 19 shows an example table illustrating a comparison of the performance of various models, including models in accordance with the present disclosure, on static and dynamic backgrounds.

FIG. 19 illustrates a table 1900 depicting a comparison of the performance of the IVM model with the performance of the existing video matting models. The table 1900 compares the performance using VM samples on static and dynamic backgrounds. Dynamic backgrounds include both background object movements and camera movements.

The method described above (i.e., "Ours") can handle both cases and performs slightly better on static backgrounds, likely because it is easier to reconstruct pixel-aligned backgrounds. On the other hand, BGMv2 performs badly on dynamic backgrounds and MODNet does not exhibit any preference. In metric, BGMv2 performs better on static backgrounds than the model described above. However, BGMv2 is expected to do worse in reality when the pre-captured background has misalignment. The model described above can handle both static background and dynamic background, but does better on static backgrounds. Although BGMv2 receives ground-truth static backgrounds, in reality, the backgrounds have misalignment.

Figure 20:
FIG. 20 shows an example table illustrating a comparison of the performance of various models.

FIG. 20 illustrates a table 2000 depicting a comparison of the IVM model (i.e., "Ours") with a modified larger model (i.e., "Ours Large"). The modified larger model uses ResNet50 backbone and has more decoder channels. The comparison is evaluated using VM dataset in HD. Size is measured in MB. The table 2000 shows that the modified larger model has better performance. The modified larger model is more suitable for server-side applications.

Figure 21:
FIG. 21 shows an example graph illustrating composited training samples from the matting datasets.

FIG. 21 illustrates a graph 2100 depicting examples of composited training samples from the matting datasets. The clips contain natural movements when compositing with videos as well as artificial movements generated by the motion augmentation. In the graph 2100, the last column (i.e., "Std Dev") shows the standard deviation of each pixel across time to visualize motion.

Figure 22:
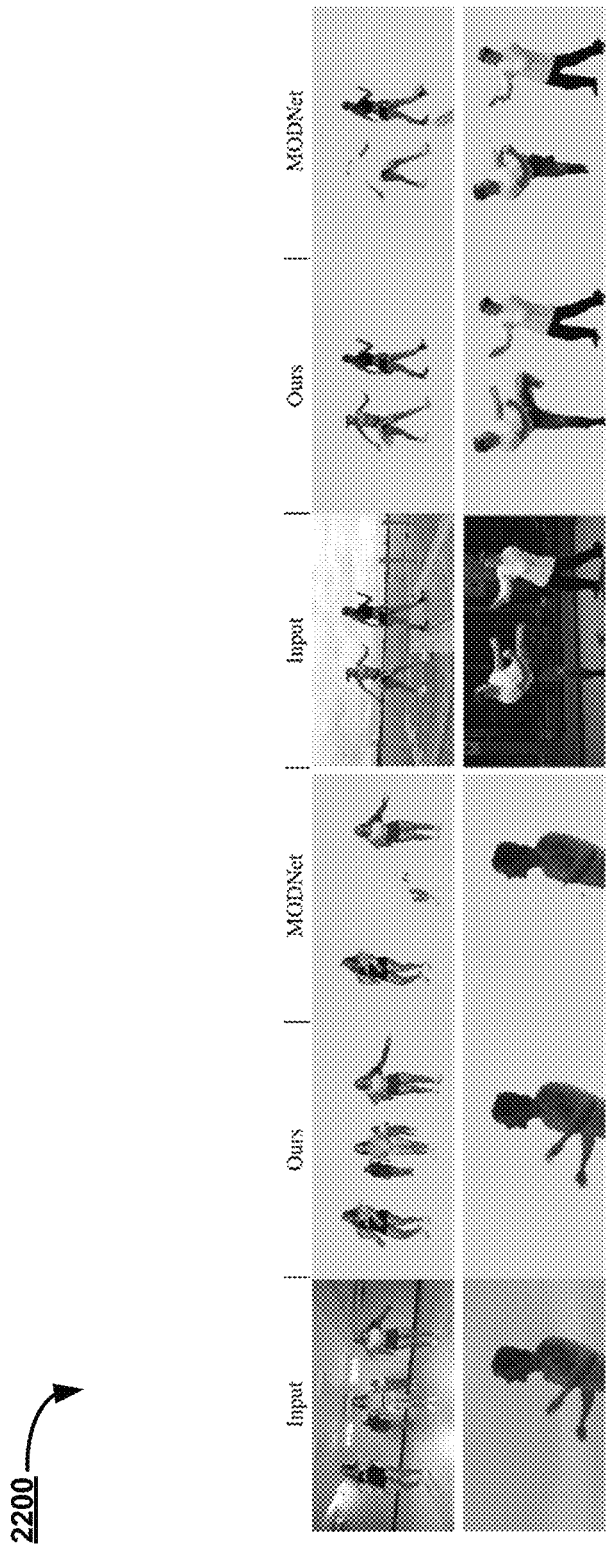
FIG. 22 shows an example graph illustrating a comparison of the performance of various models, including models in accordance with the present disclosure.

FIG. 22 illustrates a graph 2200 depicting examples of composited testing samples. The testing samples only apply motion augmentation on image foreground and background. The motion augmentation only consists of affine transforms. The strength of the augmentation is also weaker compared to the training augmentation to make testing samples as realistic looking as possible. The graph 2200 shows that the augmentation strength is weaker to make samples look more realistic.

Figure 23:
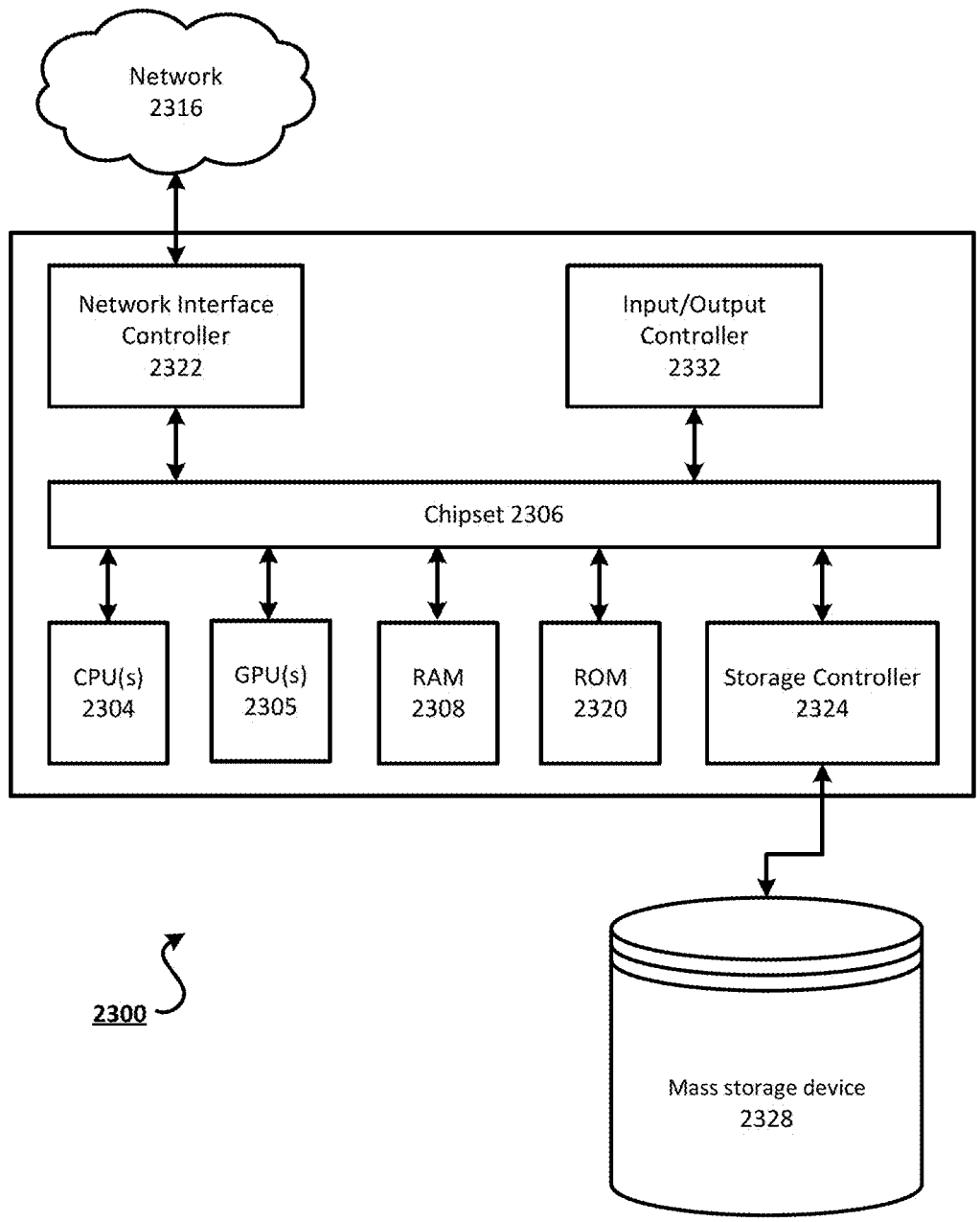
FIG. 23 shows an example computing device which may be used to perform any of the techniques disclosed herein.

FIG. 23 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 2300 of FIG. 23. The computer architecture shown in FIG. 23 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 2300 may include a baseboard, or "motherboard," which is a printed circuit board to which a multitude of components or devices may be connected by way of a system bus or other electrical communication paths. One or more central processing units (CPUs) 2304 may operate in conjunction with a chipset 2306. The CPU(s) 2304 may be standard programmable processors that perform arithmetic and logical operations necessary for the operation of the computing device 2300.

The CPU(s) 2304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 2304 may be augmented with or replaced by other processing units, such as GPU(s) 2305. The GPU(s) 2305 may comprise processing units specialized for but not necessarily limited to highly parallel computations, such as graphics and other visualization-related processing.

A chipset 2306 may provide an interface between the CPU(s) 2304 and the remainder of the components and devices on the baseboard. The chipset 2306 may provide an interface to a random-access memory (RAM) 2308 used as the main memory in the computing device 2300. The chipset 2306 may further provide an interface to a computer-readable storage medium, such as a read-only memory (ROM) 2320 or non-volatile RAM (NVRAM) (not shown), for storing basic routines that may help to start up the computing device 2300 and to transfer information between the various components and devices. ROM 2320 or NVRAM may also store other software components necessary for the operation of the computing device 2300 in accordance with the aspects described herein.

The computing device 2300 may operate in a networked environment using logical connections to remote computing nodes and computer systems through local area network (LAN). The chipset 2306 may include functionality for providing network connectivity through a network interface controller (NIC) 2322, such as a gigabit Ethernet adapter. A NIC 2322 may be capable of connecting the computing device 2300 to other computing nodes over a network 2316. It should be appreciated that multiple NICs 2322 may be present in the computing device 2300, connecting the computing device to other types of networks and remote computer systems.

The computing device 2300 may be connected to a mass storage device 2328 that provides non-volatile storage for the computer. The mass storage device 2328 may store system programs, application programs, other program modules, and data, which have been described in greater detail herein. The mass storage device 2328 may be connected to the computing device 2300 through a storage controller 2324 connected to the chipset 2506. The mass storage device 2328 may consist of one or more physical storage units. The mass storage device 2328 may comprise a management component 1010. A storage controller 2324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 2300 may store data on the mass storage device 2328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 2328 is characterized as primary or secondary storage and the like.

For example, the computing device 2300 may store information to the mass storage device 2328 by issuing instructions through a storage controller 2324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 2300 may further read information from the mass storage device 2328 by detecting the physical states or characteristics of one or more particular locations within the physical storage units.

In addition to the mass storage device 2328 described above, the computing device 2300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 2300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 2328 depicted in FIG. 23, may store an operating system utilized to control the operation of the computing device 2300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 2328 may store other system or application programs and data utilized by the computing device 2300.

The mass storage device 2328 or other computer-readable storage media may also be encoded with computer-executable instructions, which, when loaded into the computing device 2300, transforms the computing device from a general-purpose computing system into a special-purpose computer capable of implementing the aspects described herein. These computer-executable instructions transform the computing device 2300 by specifying how the CPU(s) 2304 transition between states, as described above. The computing device 2300 may have access to computer-readable storage media storing computer-executable instructions, which, when executed by the computing device 2300, may perform the methods described herein.

A computing device, such as the computing device 2300 depicted in FIG. 23, may also include an input/output controller 2332 for receiving and processing input from a number of input devices, such as a keyboard, a mouse, a touchpad, a touch screen, an electronic stylus, or other type of input device. Similarly, an input/output controller 2332 may provide output to a display, such as a computer monitor, a flat-panel display, a digital projector, a printer, a plotter, or other type of output device. It will be appreciated that the computing device 2300 may not include all of the components shown in FIG. 23, may include other components that are not explicitly shown in FIG. 23, or may utilize an architecture completely different than that shown in FIG. 23.

As described herein, a computing device may be a physical computing device, such as the computing device 2300 of FIG. 23. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the fount of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving video matting, comprising:
   extracting features from each frame of a video by an encoder of a model, wherein the video comprises a plurality of frames;
   incorporating, by a decoder of the model, into any particular frame temporal information extracted from one or more frames previous to the particular frame, wherein the particular frame and the one or more previous frames are among the plurality of frames of the video, and the decoder is a recurrent decoder; and
   generating a representation of a foreground object included in the particular frame by the model, wherein the model is trained using segmentation dataset and matting dataset, and wherein an application of the segmentation dataset to the model and an application of the matting dataset to the model are interleaved in a process of training the model.

2. The method of claim 1, further comprising:
   generating a low-resolution representative of each frame by downsampling each frame.

3. The method of claim 2, further comprising:
   encoding the low-resolution representative using the encoder, wherein the encoder comprises a plurality of convolution and pooling layers.

4. The method of claim 1, wherein the decoder comprises a plurality of convolutional gated recurrent unit (ConvGRU) for incorporating the temporal information.

5. The method of claim 1, wherein the model further comprises a Deep Guided Filter (DGF) for processing a high-resolution video.

6. The method of claim 1, wherein the model is further trained by applying at least one loss function, and wherein the at least one loss function comprises a Least Absolute Deviations (L1) loss, a Laplacian loss, and a temporal coherence loss, or a foreground prediction loss.

7. The method of claim 1, wherein the foreground object included in the particular frame is a human being.

8. A system of improving video matting, comprising:
   at least one processor; and
   at least one memory communicatively coupled to the at least one processor and storing instructions that upon execution by the at least one processor cause the system to perform operations, the operations comprising:
   extracting features from each frame of a video by an encoder of a model, wherein the video comprises a plurality of frames;
   incorporating, by a decoder of the model, into any particular frame temporal information extracted from one or more frames previous to the particular frame, wherein the particular frame and the one or more previous frames are among the plurality of frames of the video, and the decoder is a recurrent decoder; and
   generating a representation of a foreground object included in the particular frame by the model, wherein the model is trained using segmentation dataset and matting dataset, and wherein an application of the segmentation dataset to the model and an application of the matting dataset to the model are interleaved in a process of training the model.

9. The system of claim 8, the operations further comprising:
   generating a low-resolution representative of each frame by downsampling each frame.

10. The system of claim 9, further comprising:
encoding the low-resolution representative using the encoder, wherein the encoder comprises a plurality of convolution and pooling layers.

11. The system of claim 8, wherein the decoder comprises a plurality of convolutional gated recurrent unit (ConvGRU) for incorporating the temporal information.

12. The system of claim 8, wherein the model further comprises a Deep Guided Filter (DGF) for processing a high-resolution video.

13. The system of claim 8, wherein the model is further trained by applying at least one loss function, and wherein the at least one loss function comprises a Least Absolute Deviations (L1) loss, a Laplacian loss, and a temporal coherence loss, or a foreground prediction loss.

14. The system of claim 8, wherein the foreground object included in the particular frame is a human being.

15. A non-transitory computer-readable storage medium, storing computer-readable instructions that upon execution by a processor cause the processor to implement operations, the operation comprising:
extracting features from each frame of a video by an encoder of a model, wherein the video comprises a plurality of frames;
incorporating, by a decoder of the model, into any particular frame temporal information extracted from one or more frames previous to the particular frame, wherein the particular frame and the one or more previous frames are among the plurality of frames of the video, and the decoder is a recurrent decoder; and
generating a representation of a foreground object included in the particular frame by the model, wherein the model is trained using segmentation dataset and matting dataset, and wherein an application of the segmentation dataset to the model and an application of the matting dataset to the model are interleaved in a process of training the model.

16. The non-transitory computer-readable storage medium of claim 15, wherein the model further comprises a Deep Guided Filter (DGF) for processing a high-resolution video.

17. The non-transitory computer-readable storage medium of claim 15, wherein the decoder comprises a plurality of convolutional gated recurrent unit (ConvGRU) for incorporating the temporal information.

* * * * *